(12) United States Patent
Kobilarov et al.

(10) Patent No.: US 12,709,268 B1
(45) Date of Patent: Aug. 18, 2026

(54) DETERMINING OBJECTS FOR POSITION PREDICTION IN VEHICLES

(71) Applicant: Zoox, Inc., Foster City, CA (US)

(72) Inventors: Marin Kobilarov, Baltimore, MD (US); Linjun Zhang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 56 days.

(21) Appl. No.: 18/622,561

(22) Filed: Mar. 29, 2024

(51) Int. Cl.
*B60W 30/095* (2012.01)

(52) U.S. Cl.
CPC ..... *B60W 30/0956* (2013.01); *B60W 2552/10* (2020.02); *B60W 2554/4026* (2020.02); *B60W 2554/4029* (2020.02); *B60W 2554/4041* (2020.02); *B60W 2554/4042* (2020.02)

(58) Field of Classification Search
CPC . B60W 30/09; B60W 30/095; B60W 30/0956
See application file for complete search history.

(56) References Cited

U.S. PATENT DOCUMENTS 11,001,256 B2 * 5/2021 Packer .............. B60W 30/0956
11,260,855 B2 * 3/2022 Zhang ................. B60W 30/095
11,577,722 B1 * 2/2023 Packer ................. G05D 1/0088
2018/0151073 A1 5/2018 Minemura et al.
2019/0152490 A1 * 5/2019 Lan ................... B60W 30/0956
2019/0243371 A1 * 8/2019 Nister ................. B60W 30/095
2022/0135029 A1 * 5/2022 Poubel Orenstein ........................ B60W 30/0953 701/301
2023/0159059 A1 5/2023 Garimella et al.
2023/0245336 A1 8/2023 Fonseca et al.
2025/0225874 A1 7/2025 Yang et al.

OTHER PUBLICATIONS

United States non-final Office Action dated Mar. 18, 2026 for U.S. Appl. No. 18/890,627.

* cited by examiner

*Primary Examiner* — Anshul Sood
(74) *Attorney, Agent, or Firm* — EIP US LLP

(57) ABSTRACT

Techniques are disclosed in which sensor data may be received from a sensor associated with a vehicle in an environment. Based at least in part on the sensor data, a set of reachable positions of a first object in the environment in a future time window may be determined. Based at least in part on the set of reachable positions, a first metric may be determined. The first metric may be associated with likelihood of the first object interacting with the vehicle in the future time window. It may be determined, based at least in part on the first metric, to predict a future position of the first object based on a first or a second prediction method. Techniques may determine a trajectory for controlling the vehicle based at least in part on the future position of the first object.

17 Claims, 8 Drawing Sheets

DETERMINING OBJECTS FOR POSITION PREDICTION IN VEHICLES

BACKGROUND

Autonomous vehicles may include various software-based systems, hardware-based systems, and/or controllers to guide the vehicle through an environment. For example, a controller of an autonomous vehicle can use sensor systems, object perception and prediction systems, and route planning and optimization techniques to plan routes, determine drive paths, and guide the vehicle through environments containing static and dynamic objects. While traversing an environment, the autonomous vehicle may use a combination of sensor data from various sensors about the objects in the surrounding environment, as well map data representing the surrounding environment, to analyze the environment and determine how to control and navigate the vehicle in the environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
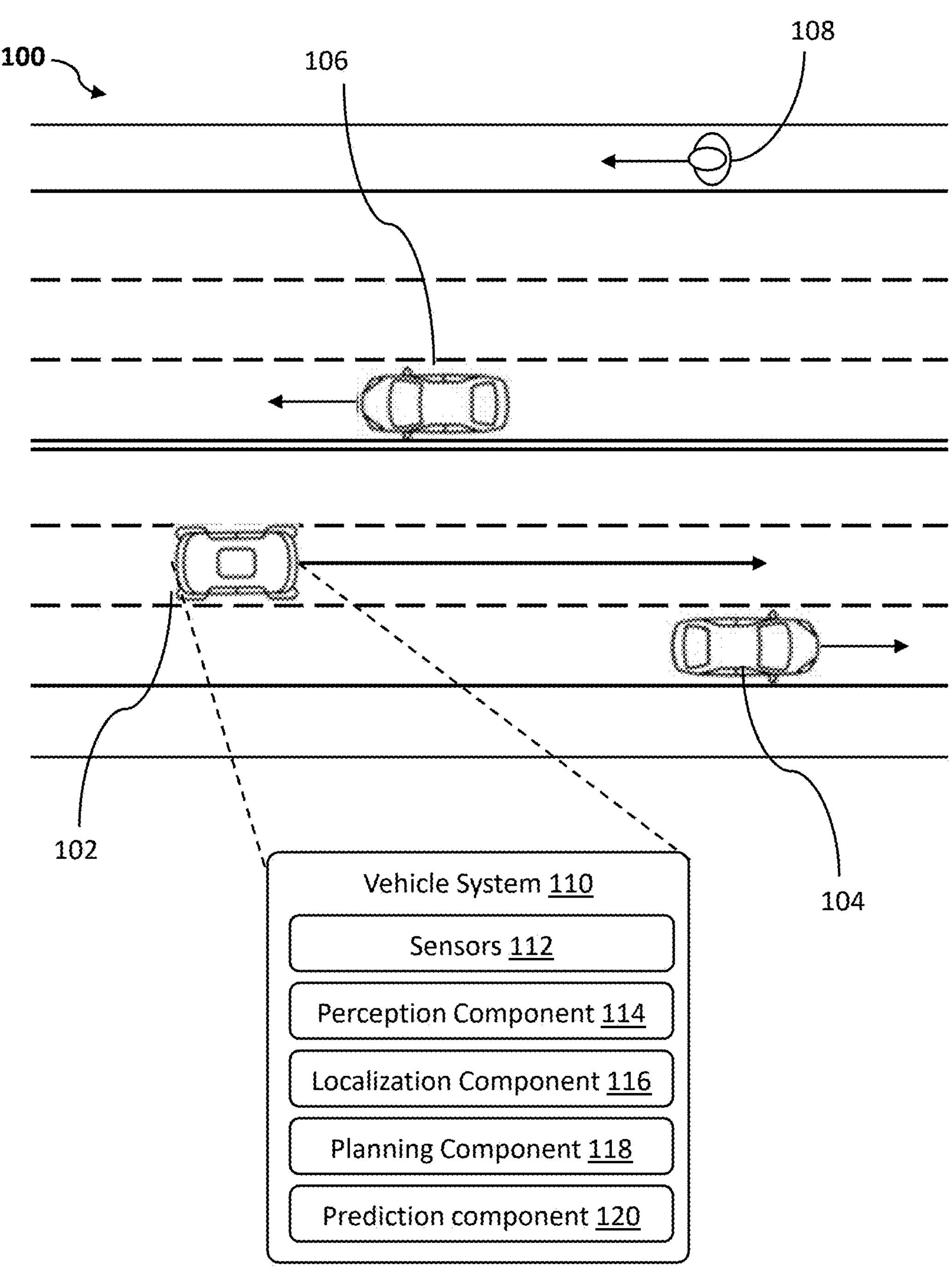
FIG. 1 is an illustration of a vehicle in an environment with a number of objects

Techniques for determining predicted future locations of objects (e.g., vehicles, pedestrians, etc.) in an environment are discussed herein. For example, techniques may include predictions based on analyses of sensor data recorded by sensors of a vehicle, such as an autonomous vehicle, in an environment. The predictions may be used to inform vehicle planning operations for determining trajectories of the vehicle through the environment. Techniques for determining predicted positions may be based on machine learned models, for example comprising a neural network such as a graph neural network (GNN). Such techniques may provide accurate predictions of future positions of objects but may be computationally difficult as the number of objects in an environment increases. For example, when the number of objects is large, the latency associated with predicting future locations of all the objects may increase, with potential downstream impacts on controlling the vehicle to navigate through the environment based at least in part on the predicted positions. Techniques of the present disclosure may determine a subset of objects in an environment to be processed according to a first prediction method, such as one based on one or more machine learned models and/or other models requiring larger amounts of computational resources. The subset may represent those objects deemed to be most important to operation of the vehicle in a future time window, for example up to 8 seconds away. Other objects, deemed to be less important to operation of the vehicle, may be processed according to a second prediction method, which may be associated with lower computational requirements than the first method. For example, the second method may comprise using one or more heuristic algorithms to estimate future positions of the less-relevant objects. Differences in the algorithms may comprise differences in computational complexity, precision, accuracy, and the like such that predictions of the more relevant objects are performed with higher precision, accuracy, length of time, time steps, etc. to ensure safer trajectory generation without additional latency. Techniques may determine relevance by approximating a reachable range of positions in the environment for all objects within the time window, for example based on one or more assumptions. Techniques may determine metrics associated with a likelihood of the vehicle interacting with the objects, for example based on importance scores for each reachable position for each object. Such metrics may be used to determine whether to process a particular object using a first prediction method, for example a machine learned method, or using a second prediction method, for example a heuristic algorithm. The techniques disclosed herein may thus provide a filter to reduce the number of objects to be processed by complex prediction methods, reducing the latency associated with predicting objects positions and thus improving control of an autonomous vehicle.

Some techniques may comprise receiving sensor data from one or more sensors associated with a vehicle in an environment, the environment including a first object; determining, based at least in part on the sensor data (e.g., based at least in part on a set of reachable positions of the first object within a future time window, the set determined based at least in part on the sensor data), a first metric associated with likelihood of the first object interacting with the vehicle in a future time window; determining, based at least in part on the first metric, to predict a future position of the first object based at least in part on a first prediction method; and determining a trajectory for controlling the vehicle based at least in part on the future position of the first object. For example, determining to predict the future position the first object may comprise determining to predict the future position of the first object based at least in part on a machine learned model, such as a GNN. Such an approach may be followed for one or more further objects in the environment. Such techniques may thus determine whether to use a potentially time and/or computational resource intensive process for predicting future positions of objects based on an initial determination of whether a given object is likely to interact with the vehicle within the prediction window.

In some techniques, if it is determined, for example based at least in part on the metric associated with an object, to not determine a future position based at least in part on the first prediction method, a second prediction method may be used. For example, techniques may comprise determining, based at least in part on the sensor data, a second metric associated with likelihood of a second object in the environment interacting with the vehicle in the future time window; and determining, based at least in part on the second metric, to omit predicting a future position of the second object based at least in part on the first prediction method. Such techniques may comprise determining, based at least in part on the second metric, an estimated future position of the second object based at least in part on a second prediction method. In some examples the second prediction method may comprise a heuristic algorithm. For example, the second prediction method may comprise determining the estimated future position of the second object based at least in part on a predetermined velocity or acceleration associated with an object class associated with the second object (e.g., based on whether the object is a vehicle, pedestrian, cyclist, etc.). As a non-limiting example, such a model may assume the object may continue traveling at a given detected rate, with maximum/minimum possible accelerations, turning rates, etc. Additionally or alternatively, the second prediction method may comprise determining the estimated future position based on a current direction of travel of the object. That is, it may be assumed that the object will not change direction within the prediction time window. Such techniques may thus provide a computationally efficient method for estimating a future prediction, which may be provided to a downstream component such as a planning component, which may determine a trajectory for the vehicle based at least in part on the heuristically-estimated future position of the second object. Such an approach provides computationally efficiency by omitting less-relevant objects from GNN-based prediction methods, while still ensuring that the trajectory planning component is provided with information about a possible future position of less-relevant objects.

In some examples, the techniques may comprise determining a set of reachable positions of the first object in the future time window; determining respective scores for plural positions of the set of reachable positions, each respective score associated with a likelihood of the vehicle interacting with the first object at the respective position; wherein the first metric is determined based at least in part on the respective scores for the plural positions. For example, the metric may be based at least in part on a combination of respective scores, such as a total or mean of the respective scores, a maximum or minimum of the respective scores, and/or any other combination of scores of a set of scores associated with the object. The reachable set of positions may be or represent the set of positions which it is estimated the first object may reach (e.g., arrive at, pass through, or pass within a predetermined range of), within the predetermined future time window.

Such examples may comprise comprising determining the reachable set of positions of the first object based at least in part on a predetermined velocity an/or acceleration associated with one or more of: the first object, an object class associated with the first object, or the environment. For example, a first velocity may be used if the object is a vehicle, a second velocity may be used if the object is a walking pedestrian, a third velocity may be used of the object is a running pedestrian, and so on. Predetermined velocities may be defined for more refined classes, such as type of vehicle, model of vehicle, etc. The predetermined velocity and/or acceleration may be determined manually, or may be determined from previous sensor measurements from object speeds, for example at the same or similar locations to the present environment. Such approaches may provide a computationally efficient method for estimating a distance the object will travel in the future time window.

Further, in such examples a first score for a first position of the set of reachable positions may be determined based at least in part on a time of arrival of the vehicle at the first position and a time of arrival of the first object at the first position. For example, the time of arrival may be a minimum time of arrival. Such an approach may weight more highly those positions where an interaction between the vehicle and the first object is likely sooner. Such an approach may prioritize those positions where the vehicle control systems have less time to react.

In some examples, the metric/score associated with an object/position and/or the set of reachable positions may be determined based at least in part on a classification associated with the object. For example, the object may be identified as being an on-road object, such as a vehicle; or an off-road object, such as a pedestrian. Different techniques may be used to determine the metric/score and/or set of reachable sets depending on whether the object is classified as on-road or off-road. For example, this may allow the inherent shape of the road and its lanes to be considered for on-road objects, while allowing more freedom of movement to off-road objects. Objects may be classified for example based on their position in relation to the environment (e.g., whether they are on a road or not), and/or may be classified based on sensor data such as image data, for example by a perception component of the vehicle.

In some examples, a score for a position may be based on a weight associated with the position. The weight may for example be associated with a distance and/or angle between a current position of an object and a possible position of that object. For example, if the object is an on-road vehicle, the weight for a position may be based on a number of lanes (and thus may be associated with a distance), for example between that position and a current position of the object. That is, the weight assigned to a position may be less if the position would mean the object changing one or more lanes, which may be deemed to have a lower likelihood than the object continuing along the same road lane. If the object is an off-road object, such as a pedestrian, the weight for a position may be based on an angle between the second position and a direction of a current velocity of the first object. For example, as the angle increases, the weight may reduce. Such an approach may assume that an object is most likely to continue in the same direction and is less likely to reach a position the more of a turn that position would represent. Such examples thus allow all reachable positions of an object to be considered, while reflecting an estimated likelihood of the object actually reaching those positions. In some examples, the weight may be associated with a current or future positions of the vehicle. For example, the weight may be associated with a distance and/or angle between a possible position of an agent and a current or future position of the vehicle; and/or may be associated with a distance and/or angle between a current position of an agent and a current or future position of the vehicle.

Some examples may comprise omitting determining a score for a position of the set of reachable positions in a number of situations. For example, determining a score may be omitted if a position is not associated with a planned or reference trajectory of the vehicle. A planned trajectory may be an initial and/or high-level path the vehicle is expected to follow, e.g., based on a starting point and a destination. The planned trajectory may be one input used along with predicted object positions when determining a control trajectory determining a specific path through the environment, for example by a planning component. If the vehicle is not planned to pass through a particular location, determining a score may be omitted. In other examples, a score may be determined based at least in part on a weight associated with likelihood of the vehicle reaching that position. This vehicle weight may be '1' if the position is along or near the planned trajectory and may be '0' otherwise. The vehicle weight may be applied as a factor in determining the position score, thus a vehicle weight of '0' may reduce the position to score to '0', effectively negating the score for that position. Other situations in which a score for a position may be omitted may include where a maximum arrival time of the vehicle at the third position being earlier than a minimum arrival time of the first object at the third position; and/or where a maximum arrival time of the first object at the second position being earlier than a minimum time of arrival of the vehicle at the third position. In other words, if there is not likely to be temporal overlap of the vehicle and object at a given position, determining a score for that position may be omitted. Such techniques may reduce the number of positions to process, further increasing the computational efficiency of the present techniques.

In some examples, the first metric for the first object may be determined based at least in part on processing the respective scores for the plural position based at least in part on a parallel reduction algorithm. A parallel reduction algorithm may efficiently compute aggregate functions such as sum, minimum, maximum, etc., of the position scores for multiple objects. Such algorithms may be particularly efficiently performed by a graphical processing unit (GPU). Such an approach may therefore allow a large number of objects (e.g., 500 or more) to be efficiently considered in parallel, allowing the present techniques to provide a low-latency initial processing of objects in the environment around the vehicle. Other examples may use other algorithms or techniques for determining the first metric from the respective scores, and/or may use other processing hardware such as a CPU.

Some techniques may comprise receiving sensor data from a sensor associated with a vehicle in an environment, the environment including a first object; determining, based at least in part on the senor data, a first set of positions reachable by the first object in a future time window; determining, for a first position of the first set of positions, a time associated with arrival of the first object at the first position and a weight associated with a likelihood of the first object travelling to the first position, the first position associated with a planned trajectory of the vehicle; determining a time associated with arrival of the vehicle at the first position; determining, based at least in part on the weight for the first vehicle and the times associated with arrival of the first object and the vehicle at the first position, a score associated with the first position; determining to include the first object in a set of objects based at least in part on the score associated with the first position; determining, based at least in part on one or more machine learned models, predicted future positions of objects in the set of objects; and controlling the vehicle to traverse the environment based at least in part on the predicted future positions.

The techniques discussed herein may improve a functioning of a computing device, such as a computing device of an autonomous vehicle, in a number of ways. For example, the various techniques described herein provide technical improvements in the prediction and planning capabilities of autonomous vehicles, by determining a relevant subset of objects around the vehicle to process by a machine learned prediction method, reducing computational burden associated with predicting positions of all objects. The techniques discussed herein may also improve the performance, e.g., safety, of a vehicle such as an autonomous vehicle, by ensuring trajectories may be determined, e.g., by a planning component, in a timely manner based on computationally efficiently determined future predictions of objects around the vehicle.

FIG. 1 illustrates an example environment 100 in which a vehicle 102 is travelling on a road. The vehicle 102 may in some examples be an autonomous or semi-autonomous vehicle. The vehicle 102 may be an example of vehicle 802 discussed below. A number of example objects 104-108 are also travelling through environment 100. In this example, a first object 104 is a vehicle travelling in the same direction as the vehicle 102. A second object 104 is a vehicle travelling on the other side of the road in the opposite direction to the vehicle 102, but is currently forwards of the position of the vehicle 102 (viewed from the perspective of the vehicle 102). A third object 108 is a pedestrian walking along a sidewalk adjacent to the road. When determining a trajectory for the vehicle 102 to travel through the environment, it may be important to consider future positions of the objects 104-108 around the vehicle. However, an environment 100 may typically comprise a large number of objects. Predicting future positions for all such objects may be computationally intensive and add in significant amounts of latency, otherwise yielding potentially unsafe operations.

The vehicle 102 may include one or more sensors 112, which may be part of a wider vehicle system 110. The sensors 112 may gather sensor data relating to a state of the vehicle 102 and to a state of the environment 100 surrounding the vehicle 102. If other objects such as vehicles, pedestrians, street furniture, street markings, or static vehicles are present in the vicinity of the vehicle (e.g., objects 104-108 in the example of FIG. 1), the sensors 112 may gather data in relation to these features. In some instances, the sensors 112 may include LiDAR sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensors 112 may include multiple instances of each of these or other types of sensors. For instance, the radar sensors may include individual radar sensors located at the corners, front, back, sides, and/or top of the vehicle 102. As another example, the cameras may include multiple cameras disposed at various locations about the exterior and/or interior of the vehicle 102. Example sensors are also described below in relation to FIG. 8.

The vehicle system 110 may also include other components such as a perception component 114, a localization component 116, a planning component 118, and a prediction component 120. The specific systems shown within vehicle system 110 in FIG. 1 are provided for the purpose of explaining FIG. 1 and may form only a part of a wider vehicle system, an example of which is described later in relation to FIG. 8. The vehicle 102 may comprise any systems appropriate to enable its autonomous or semi-autonomous control.

The perception component 114 may be configured to generate perception data based on the sensor data recorded by the sensors 112. The perception component may detect object(s) (such as object 104) in in the environment surrounding the vehicle 102 (e.g., identify that an object exists), classify the object(s) (e.g., determine an object type or object class associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like, and may output perception data associated with the same.

The localization component 116 may be configured to generate localization data based on sensor data from the sensors 112. The localization component 116 may include hardware and/or software to receive data from the sensors 112 to determine localization data, which may include a position, velocity, and/or orientation of the vehicle 102 (e.g., one or more of an x-, y-, z-position, roll, pitch, or yaw). The localization component 116 may receive data relating to one or more maps in order to determine position, velocity, and/or orientation of the vehicle 102. In some examples, the localization component 116 may be configured to provide data to the perception component 114. The one or more maps may represent the environment in which the vehicle 102 is driving. The one or more maps may represent an environment in which the vehicle 102 is permitted to drive. The one or more maps may comprise maps relating to different characteristics of the environment. The one or more maps may include a road network map.

The planning component 118 may be configured to generate planning data based on data from the sensors 112, perception component 114, and localization component 116, as well as the prediction component 120. In some examples, the types of data may include vehicle mission data, state data, object data, road feature data, and/or any other type of data. In some examples, the vehicle 102 may use the sensors 112 to capture sensor data of the environment. Upon capturing such sensor data, the vehicle 102 may send the sensor data to the perception component 114 configured to detect and/or classify object(s) within the environment and to the prediction component 120 configured to predict object information and/or characteristics, such as future object positions. The data from the perception and/or prediction components 114, 120 may be sent to the planning component 118 for further processing. The planning component 118 may include a machine-learned model component configured to output a diverse set of candidate trajectories. The planning component 118 may include a tree structure component configured to determine a control trajectory, according to which the vehicle 102 is to be controlled, based on the candidate trajectories received from the machine-learned model component and/or another trajectory-generating component. The tree structure component may generate a tree structure to enable the vehicle to evaluate the candidate trajectories at each state of the vehicle and to determine a control trajectory for the vehicle to follow based on such candidate trajectories.

The prediction component 120 may be configured to generate prediction data, for example including future object positions based on data from the sensors 112, perception component 114, and localization component 116. Sensor data and data from components of the vehicle system may be provided to other components to generate further analysis data. The prediction component 120 may predict future positions of objects in the environment 100 to inform the planning operations performed by the planning component 118. For example, the prediction component 120 may predict a plurality of possible positions of one or more of the objects 104-108 at a future time and may provide the plurality of possible positions to the planning component 114. The planning component 118 may then determine a trajectory based at least in part on the plurality of possible positions. For example, this may allow trajectories to be determined which provide for safe operation of the vehicle 102 as other objects move around the environment 100.

In some examples, the prediction component 120 may determine a series of prediction positions, for example at regular time intervals. For example, the prediction component 120 may generate predicted positions at 1 second intervals. In some examples, the series of predicted positions may be provided sequentially to the planning component 118. The planning component may perform planning operations based for example on a first predicted position in the sequence. The planning operations, for example associated with movements of the vehicle 102, may then inform updates to the remaining series of predicted positions. Thus, the prediction component 120 and planning component 118 may cooperate to predict positions of objects (such as object 104) and determine vehicle 102 trajectories that account for the dependence of the vehicle 102 movements on other objects in the environment and vice versa.

In some examples, the prediction component 120 may first determine a plurality of predicted positions of an object (e.g., object 104) at a future second time, based on sensor data associated with a present first time. The prediction component 120 may then, for at least one of the predicted positions at the second time, determine an intermediate sequence of predicted positions between the first time and the second time, and optionally beyond the second time. In effect, the predicted positions at the second time may be used to classify possible paths of the object before backfilling those paths with a series of positions.

In some examples, a predicted position of an object may be determined based at least in part on determining one or more features associated with the object and/or with the environment 100, for example from the sensor data. For example, features may relate to the pose of the object, and/or to a mode of the object such as whether a turn signal is enabled. In some non-limiting examples, a graph may be determined, for example with each node representing an object in the environment or the vehicle 102. The graph may in some examples be processed by a graph neural network (GNN), and an output of the GNN may be used to determine predicted positions of objects in the environment. Further details of predicting future positions of objects may be found in US2023159059A1, which is incorporated herein by reference in its entirety for all purposes.

In some examples of the present disclosure, the prediction component 120 (or generally vehicle system 110) may determine or estimate future positions of objects based on a first prediction method or a second prediction method. The first prediction method may comprise the considerations discussed above, for example including a machine learned model such as, but not limited to, a GNN. The second prediction method may be a heuristic-based method, estimating predicted positions using conventional (i.e., non-machine learned) algorithms. The second prediction method may thus be computationally more efficient than the first prediction method. Techniques of the present disclosure may determine which method to use for a given object based on a relevance of that object, for example associated with an estimated likelihood of the vehicle 102 and an object interacting.

Figure 2:
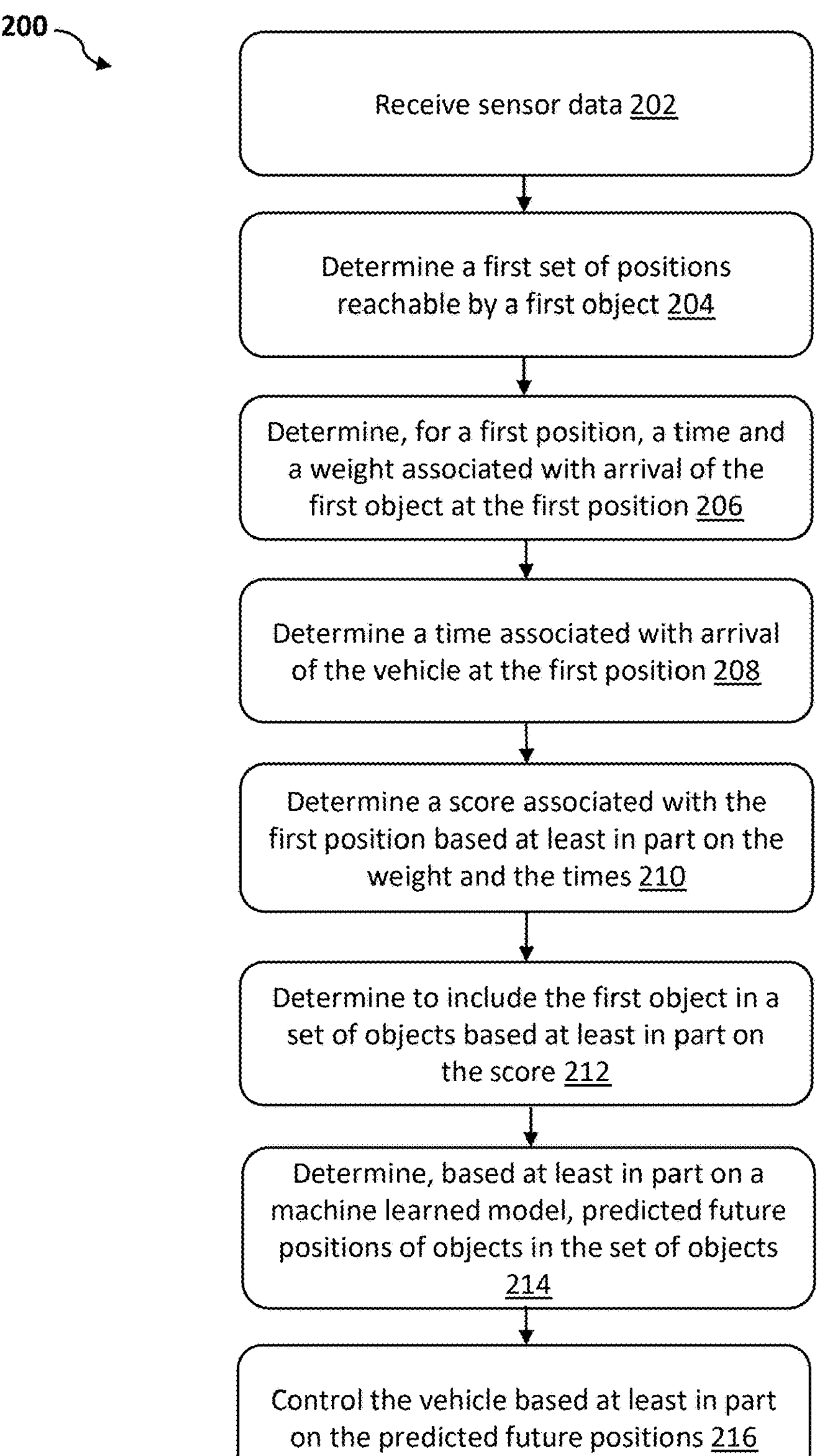
FIG. 2 depicts a flow chart of a process according to the present disclosure.

FIG. 2 illustrates a process 200 which may be used to determine whether to process an object according to a more computationally intensive prediction technique. Process 200 may be implemented on a system comprising one or more processors and one or more non-transitory computer-readable media storing instructions that, when executed, perform the operations of process 200. Process 200 may be implemented as one or more transitory or non-transitory computer-readable media storing instructions executable by one or more processors, wherein the instructions, when executed, cause the one or more processors to perform the operations of process 200. Process 200 may be implemented as a computer program comprising instructions which, when executed by a computer device, cause the computer device to perform the operations of process 200. Process 200 may be implemented on vehicle computing device 804 described below in relation to FIG. 8. Process 200 may be implemented at least in part by prediction component 120. Although primarily described herein as being performed onboard a vehicle, in some examples process 200 may be performed by a remote computer system, such as the computer device(s) 832 discussed in relation to FIG. 8.

Process 200 may comprise operation 202, comprising receiving sensor data from a sensor associated with a vehicle 102 in an environment, the environment including at least a first object 104.

Process 200 may comprise operation 204. Operation 204 may comprise determining, based at least in part on the senor data, a first set of positions reachable by the first object 104 in a future time window. For example, the future time window may be associated with a planning time horizon of the planning component 118, such as up to 8 seconds. As used herein, the reachable set of positions may be the set of positions or range of positions which an object could possibly reach within the future time window, based on one or more assumptions. In particular, the reachable set may be based on a distance the object may travel assuming a predetermined velocity, such as a maximum expected velocity (e.g., speed limit), associated with the environment 100, and/or predetermined velocity associated with a class of the object (e.g., whether the object is a vehicle or pedestrian; type of vehicle; whether a pedestrian is a walker or a runner, etc.).

Figure 3:
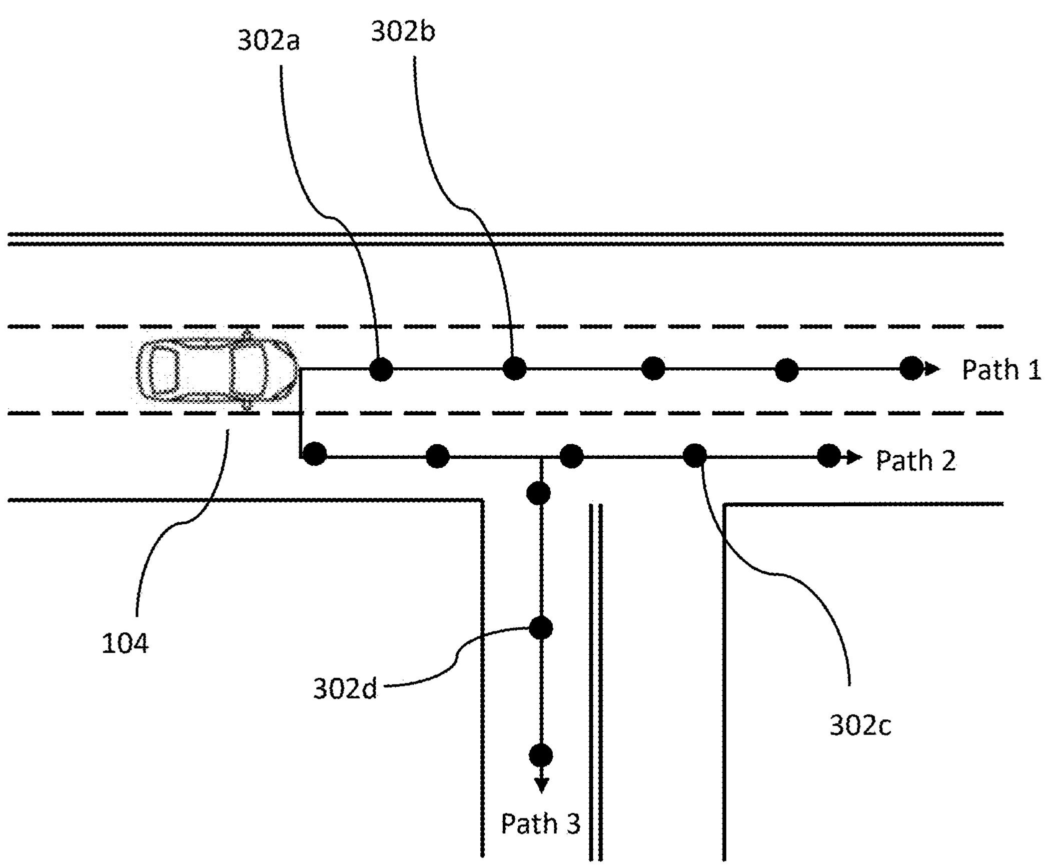
FIG. 3 illustrates an example of determining reachable positions of an on-road object.

FIG. 3 illustrates an example reachable set of positions 302 for a first object 104. In this example, the first object 104 is an on-road vehicle. As such, it may be assumed that the first object 104 will travel within a road lane, possibly with one or more lane changes, and/or turns onto connecting roads. FIG. 3 illustrates three possible paths of the first object 104. 'Path 1' comprises the first object 104 continuing in the same lane. 'Path 2' comprises the first object 104 changing lanes. 'Path 3' comprises the first object 104 changing lanes and making a right turn. FIG. 3 may represent a simplified example of a reachable set, in practice there may be more positions and/or more paths in the reachable set (e.g., including the lane to the left of the object 104 in FIG. 3). As will be appreciated, there may be many possible paths, including in some examples the first object 104 executing a U-turn. The paths (e.g., lanes) may be determined based at least in part on map data, for example map data stored in memory associated with the vehicle control system 110.

The reachable set of positions 302 may be determined based on determining a maximum distance d the first object 104 is likely to travel in the future time window T. The maximum distance d may be determined as $d=v_{max}\times T$, where $v_{max}$ is a predetermined speed. $v_{max}$ may represent an expected maximum speed of the first object 104 in the environment 100. For example, where the first object 104 is an on-road vehicle, $v_{max}$ may be the speed limit of the road on which the first object 104 is travelling (e.g., as stored in map data), may be based on said speed limit (e.g., including a buffer above the speed limit). Alternatively or additionally, $v_{max}$ may depend on a class of the first object 104. For example, cars may be assigned a higher expected speed than a semi-truck. In some examples, $v_{max}$ may be determined based on previously recorded observations of vehicle speeds, for example in environment 100 or in similar environments. In some examples $v_{max}$ may be determined based on a current speed of the first object 104, for example as determined from the sensor data. For example, if the first object 104 is already going over the speed limit, its current speed may be taken as $v_{max}$.

The maximum distance d may be used to determine the range of positions 302 along each possible path that the first object 104 may reach. Thus, each of the example illustrated paths may be the same length, each representing the determined maximum distance d. The full set of reachable positions may include the positions at the maximum distance along a path, and positions between the current object position and that maximum distance. A number of example positions 302 are illustrated in FIG. 3. For example, reachable positions 302*a*, 302*b* may be on 'Path 1', reachable position 302*c* may be on 'Path 2', and reachable position 302*d* may be on 'Path 3'. As in the illustrated example, the set of predicted positions 302 may be discretized, for example providing equally spaced (in time or distance) reachable positions 302 along the possible paths. In other examples, at least initially, a continuous range of reachable positions 302 may be provided (e.g., as represented by each line representing the possible paths). Such continuous ranges may subsequently be discretized, as discussed below in relation to FIG. 5A.

This approach for determining a set of predicted positions may be used for any on-road objects in the environment 100, for example including first object 102 and second object 104.

Figure 4:
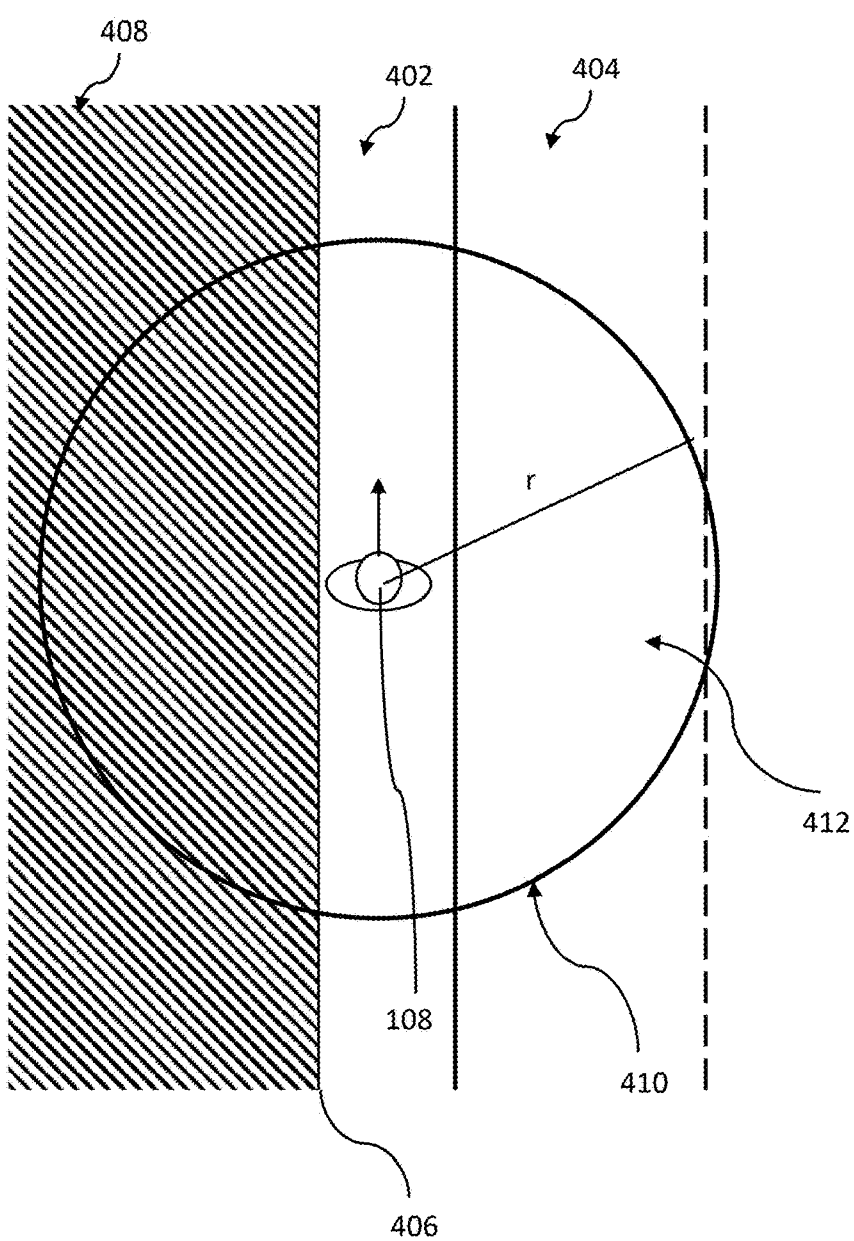
FIG. 4 illustrates an example of determining reachable positions of an off-road object.

FIG. 4 illustrates an alternative approach for determining a set of predicted positions. The technique illustrated in FIG. 4 may be used for example for off-road objects, such as pedestrians, cyclists, and/or animals.

FIG. 4 illustrates the third object 108 from FIG. 1, i.e., a pedestrian 108, travelling along a sidewalk adjacent to the road 404 on which the vehicle 102 (not shown in FIG. 4) is travelling. In this example, there is a barrier 402 such as a wall or fence on the non-road side of the sidewalk, limiting the lateral movement of the third object 108.

The set of predicted positions for a non-road object such as third object 108 may be determined based at least in part on a maximum radius r which the third object 108 is expected to be able to reach within the future time window T. Similarly to the maximum distance discussed above for an on-road object, the maximum radius r may be determined as $r=v_{max}\times T$. As above, $v_{max}$ may be a predetermined speed, for example representing an expected maximum speed of the third object 108. $v_{max}$ may depend on a class of the object, for example a first speed may be assigned to pedestrians, and a higher second speed may be assigned to cyclists. Pedestrians may be further categorized according to their speed, for example as walkers, joggers, or runners. A different $v_{max}$ may be assigned to each pedestrian class. The predetermined speeds may be manually determined, or may be determined based on recorded observations, for example from the environment 100 or similar environments.

The maximum radius r may be used to define a circle 410 centered on the third object 108 representing a set of reachable positions. The set of reachable positions may comprise all positions with the circle 410, or a discretized representation thereof. In other examples, as illustrated in FIG. 4, a region of circle 410 may be unconnected to sidewalk (e.g., inaccessible to the third object 108). In the illustrated example, the area behind the barrier 406 may be inaccessible to the third object 108. As such, the set of reachable positions may be those positions within segment 412 of circle 410. In further examples, such a circle may be further narrowed based on whether the object is capable of accelerating equally in all directions. As a non-limiting example, while a pedestrian may be able to virtually change directions instantaneously in which a full circle may be associated, a person pushing a cart may not be able to move equally in all directions and the area may be further limited.

Figures 5A, 5B:
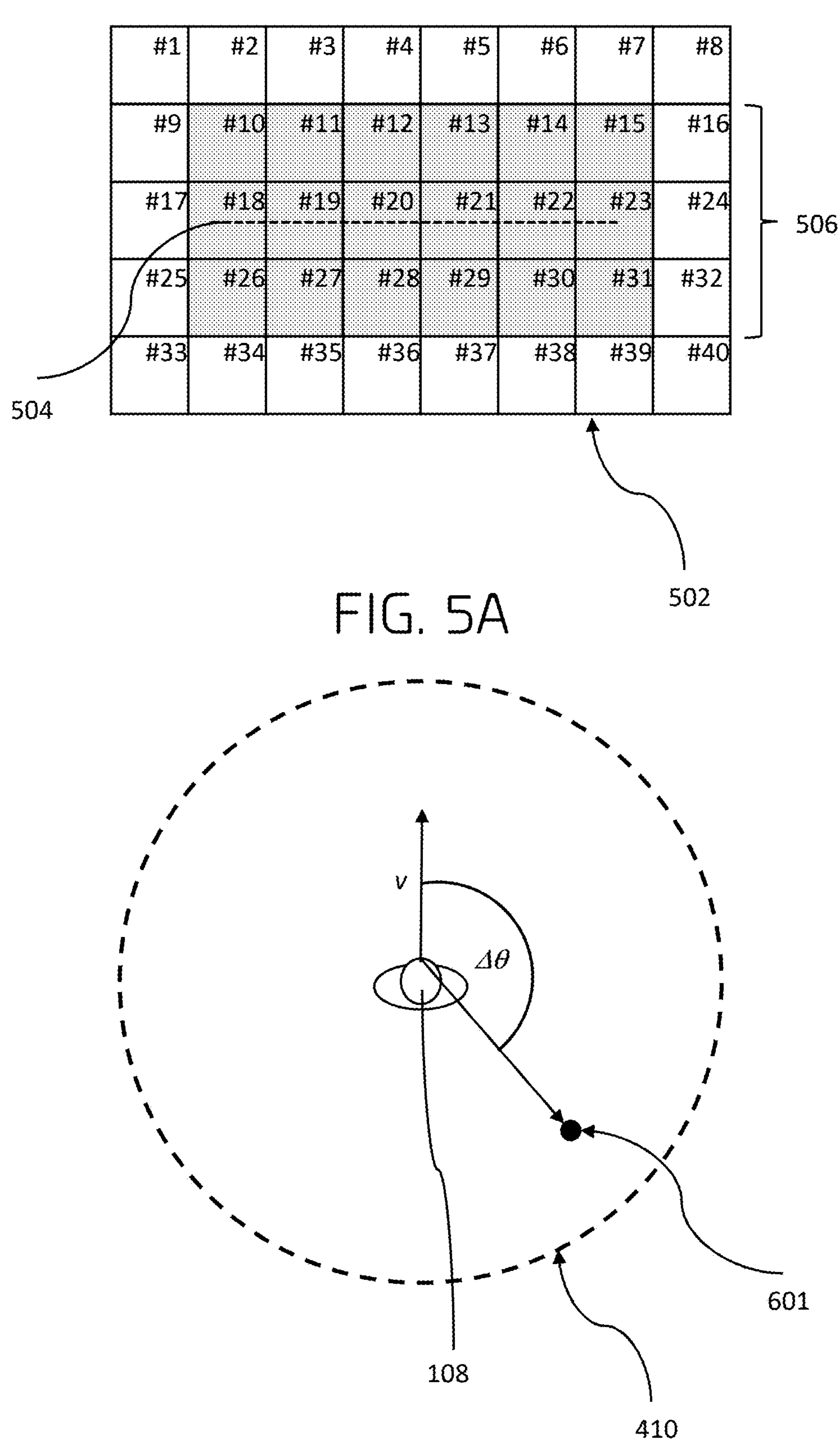
FIG. 5A illustrates an example occupancy grid.
FIG. 5B illustrates an example method to determine a weight associated with a position.

In some examples, the set of reachable positions may be a set of discrete positions, for example positions associated with, or belonging to, a predefined array representing the environment 100, FIG. 5A illustrates an occupancy grid 502 which may be an example of discretizing the set of reachable positions of an object. In this example, the environment 100, or a portion thereof, may be represented by a 2D grid of polygons, in this example squares. Each polygon may be associated with a unique identifier, illustrated in FIG. 5 by the number in each square. The example occupancy grid 502 may be represent a portion of a larger occupancy grid representing the environment 100. The range of predicted positions, for example as determined above, may be mapped onto the occupancy grid 502 to determine discretized positions reachable by an object. In the illustrated example, a line 504 may represent one possible path of an on-road objects such as first object 104, representing a maximum distance d as discussed above. In practice positions of multiple or all possible paths, optionally including buffer areas for each path, may be mapped to an occupancy grid such as grid 502. The line 504 may represent a center line of a lane in which the first object 104 is expected to travel. The line 504 passes through polygons #18 to #23, representing the estimated distance the first object 104 may travel within the future time window. These polygons are shaded to indicate they are part of a reachable set of positions. A lateral buffer may be provided to account for possible deviations of the first object 104 from the center line, represented by the shaded polygons #10-#15 and #26-#31. Together, the shaded polygons represent a set 506 (or subset) of reachable positions for the first object 104. As discussed above, there may be multiple possible paths travelled by the first object 104, each of which may be mapped onto the occupancy grid 502 in a similar way to determine a set 506 of reachable positions. In examples where an object is an off-road object with a set of positions determined as in FIG. 4, the reachable circle 410 or sector 412 may be mapped onto the occupancy grid 502, with all grid polygons within the circle 410/sector 412 and all grid polygons through with the outer boundary of circle 410/sector 412 passes deemed reachable positions. By such techniques, a respective set 506 of discretized reachable positions may be determined for each object in the environment 100. That is, the reachable positions determined in operation 204 of process 200 may be occupied polygons of an occupancy grid 504.

Returning to FIG. 2, process 200 may comprise operation 206. Operation 206 may comprise determining, for a first position of the first set of positions associated with the first object 104, a time associated with arrival of the first object at the first position and a weight associated with that position, for example a weight associated with a likelihood of the first object travelling to the first position.

The time associated with arrival of the first object 104 may be a minimum expected time of arrival, $t_{min}$, of the first object 104 at the first position. A minimum expected time of arrival, $t_{min}$, may be determined as:

$$t_{min} = \begin{cases} \dfrac{\sqrt{v^2 + 2a_{max}s} - v}{a_{max}}, & \text{if } s \le \overline{s}, \\ \dfrac{v_{max} - v}{a_{max}} + \dfrac{s - \overline{s}}{v_{max}}, & \text{otherwise} \end{cases}$$

where $$\overline{s} = \frac{v_{max}^2 - v^2}{2a_{max}}.$$

Here, v represents a current speed of the first object 104, for example as determined from the sensor data. s represents the travel arc-length, for example representing the course of a lane in the case of an on-road object, or an assumed straight line from the grid polygon center of the given position to the current position of the object in the case of an off-road object. $v_{max}$ represents the empirical maximum speed, which may be the same maximum speed as used above in determining the reachable set of positions. $a_{max}$ represents the empirical maximum value of acceleration, and amin represents the empirical minimum speed, both of which may be predetermined and may depend on object class, similarly to the considerations discussed above in relation to the maximum speeds.

In some examples, a maximum expected time of arrival, $t_{max}$, may be determined for the first object 104. A maximum expected time of arrival, $t_{max}$, may be determined as:

$$t_{max} = \begin{cases} \dfrac{\sqrt{\Delta} - v}{a_{min}}, & \text{if } \Delta \ge 0, \\ \infty, & \text{otherwise} \end{cases}$$

where $$\Delta = v^2 + 2a_{min}s.$$

As discussed below, the minimum expected time of arrival may be used in determining a score associated with a given reachable position, and the maximum expected time of arrival may be used in determining whether to omit determining a score for a given position.

The weight determined for the first position may be associated with a likelihood of the first object 104 travelling to that first position. For example, while a position may theoretically be reachable within the future time period T, it may still be unlikely that the first object 104 may actually reach this position.

In some examples, the weight for the first position may be determined based at least in part on a number of lanes between a current position of the first object 104 and the first position. Such an approach may be used for example where the first object 104 is an on-road object. The weight (representing the likelihood) may decrease as the number of lanes between the current position and first position increases. That is, the more lane changes required, the less likely the first object 104 travels to the first position. In some examples, the weight w for a first position may be determined as:

$$w=\gamma^n$$

where $0<\gamma<1$ acts as a predetermined decay rate.

In other examples, the weight for the first position may be determined based at least in part on an angle $\Delta\theta$ between a current direction of travel of the first object 104 and the first position (e.g., discretized cell in the set of cells). Such an approach may be used for example for off-road objects. FIG.

5B illustrates an example of an angle $\Delta\theta$ between a current direction of travel of an object (in this example, pedestrian 108) and a position 601. As illustrated, a current direction of travel may be a direction of a velocity of the pedestrian 108 at the current time. The weight of the first position may be determined such that the weight is lower the bigger the angle $\Delta\theta$ between the current direction and the first position. That is, the bigger the turn that would be required to reach the first position, the less likely the position is deemed to be. In some examples, the weight w for the first position may be determined as:

$$w = \alpha + (1 - \alpha)\frac{1 + \cos(\Delta\theta)}{2},$$

where $\alpha$ is a predetermined constant, which may be associated with the expected likelihood that the first object 104 will turn 180-degrees. In some examples $\alpha$ may be zero.

It is noted that the formulas for weights discussed above are provided as non-limiting examples. In general, any formulation of weight associated with likelihood of the first object travelling to a given position may be used.

In some examples, operation 206 may be performed for all positions in the reachable set of positions for one or more objects. In other examples, operation 206 may be performed only for a subset of the reachable set of positions for a given object. In some examples, operation 206 may be performed only for those positions associated with a planned or reference trajectory of the vehicle. The planned trajectory of the vehicle may be an initial trajectory planning a route through environment 100, for example from an origination point to a destination point, for example as determined before the vehicle 102 departed on its present journey. The planned trajectory may in some examples determine which roads the vehicle 102 may follow but may lack more detailed information such as which lane to use. Some examples may consider those reachable positions of objects which lie on possible paths of the vehicle 102, based on the planned trajectory. In other examples, operation 206 may be performed for a reachable position of an object independently of the possible paths of the vehicle 102; the paths of the vehicle may then be accounted for by a vehicle weight in a score for the position, as discussed below.

In some examples, a reachable position of the set of reachable positions for an object may be removed from further consideration based at least in part determining a likely temporal overlap, or lack thereof, between that object and the vehicle 102 at that position. For example, a likely minimum time of arrival of the object may be determined, as above. A likely maximum time of arrival of the vehicle 102 may be determined, for example based at least in part on the planned trajectory and/or using the formula above discussed in relation to an object. It may be determined if the minimum time of arrival of the object at the position is less than the maximum arrival time of the vehicle 102 at the position. If not, it may be determined that an interaction between the vehicle 102 and the object at that position is unlikely, and so the position may be dropped from consideration. For example, a weight and/or score may not be determined for such a position. Alternatively or additionally, it may be determined whether a maximum time of arrival of the object at the position (determined as above) is less than a minimum time of arrival of the vehicle 102 at the position (determined for example based at least in part on the planned trajectory and/or using the formula above). If the maximum time for the object is less than the minimum time for the vehicle 102, that position may be discarded.

Returning to FIG. 2, process 200 may further comprise operation 208. Operation 208 may comprise determining a time associated with arrival of the vehicle at the first position. For example, a minimum time of arrival of the vehicle 102 at the first position may be determined, for example based at least in part on the planned trajectory of vehicle 102, a current trajectory determined by the planning component 118 being followed by the vehicle, and/or the minimum arrival time formula above.

Process 200 may further comprise operation 210. Operation 210 may comprise determining, based at least in part on the weight for the first vehicle and the times associated with arrival of the first object and the vehicle at the first position, a score associated with the first position. The score for the first position may be determined based at least in part on the (e.g., minimum) time of arrival of the vehicle 102 at the first position (for as example as determined in operation 208) and based at least in part on the (e.g., minimum) time of arrival of the first object 104 at the first position. The score for the first position may be determined based at least in part on a number of lanes between the first position and the current position of the first object 104. The score for the first position may be determined based at least in part on an angle between a current direction of travel of the first object 104 and the first position. The score for the first position may be determined based at least in part on the weight for that position as determined above in operation 206.

In some examples, a score, s, for the first position may be determined as:

$$s = w_{vehicle} \times w_{object} \times \exp(-\beta \times t_{vehicle} \times t_{object}),$$

where $w_{object}$ is the weight for the first position associated with the first object 104, for example determined as in operation 206. $t_{vehicle}$ is a time of arrival of the vehicle 102 at the first position, for example a minimum time of arrival. $t_{object}$ is a time of arrival of the first object 104 at the first position, for example a minimum time of arrival. Using the minimum times of arrival may increase the score for interactions that may occur sooner rather than later, and which may therefore be more important to consider with the full GNN-based prediction technique to ensure safe and comfortable operation of vehicle 102. $w_{vehicle}$ is an optional factor representing a weight or likelihood of the vehicle 102 travelling to the first position. In some examples, $w_{vehicle}$ may only be '1' or '0'. For example, $w_{vehicle}$ may be '1' if the first position lies on a possible path of the vehicle 102, as determined for example based at least in part on a planned trajectory of the vehicle 102. $w_{vehicle}$ may be '0' if the first position does not lie on such a path. As such, some examples may omit $w_{vehicle}$, and may instead remove positions from further consideration based on the planned trajectory of vehicle 102, such that a score would not be determined for such a position. In other examples, $w_{vehicle}$ may be determined similarly to the weights for on-road objects discussed above in relation to operation 206, for example being based at least in part on a number of lanes between a current position of the vehicle and the reachable position in question.

Although discussed above in relation to a first position of a first object 104, it is noted that respective scores may be similarly determined for multiple positions of the first object 104, and for multiple objects in the environment 100.

In some examples, a metric, $m_1$, may be determined representing a likelihood of the first object 104 interacting with the vehicle 102 in the future time window T. Such a metric may be determined based at least in part on the score for one or more reachable positions associated with the first object 104. Similarly, respective metrics may be determined for other objects in the environment 100.

Figure 6:
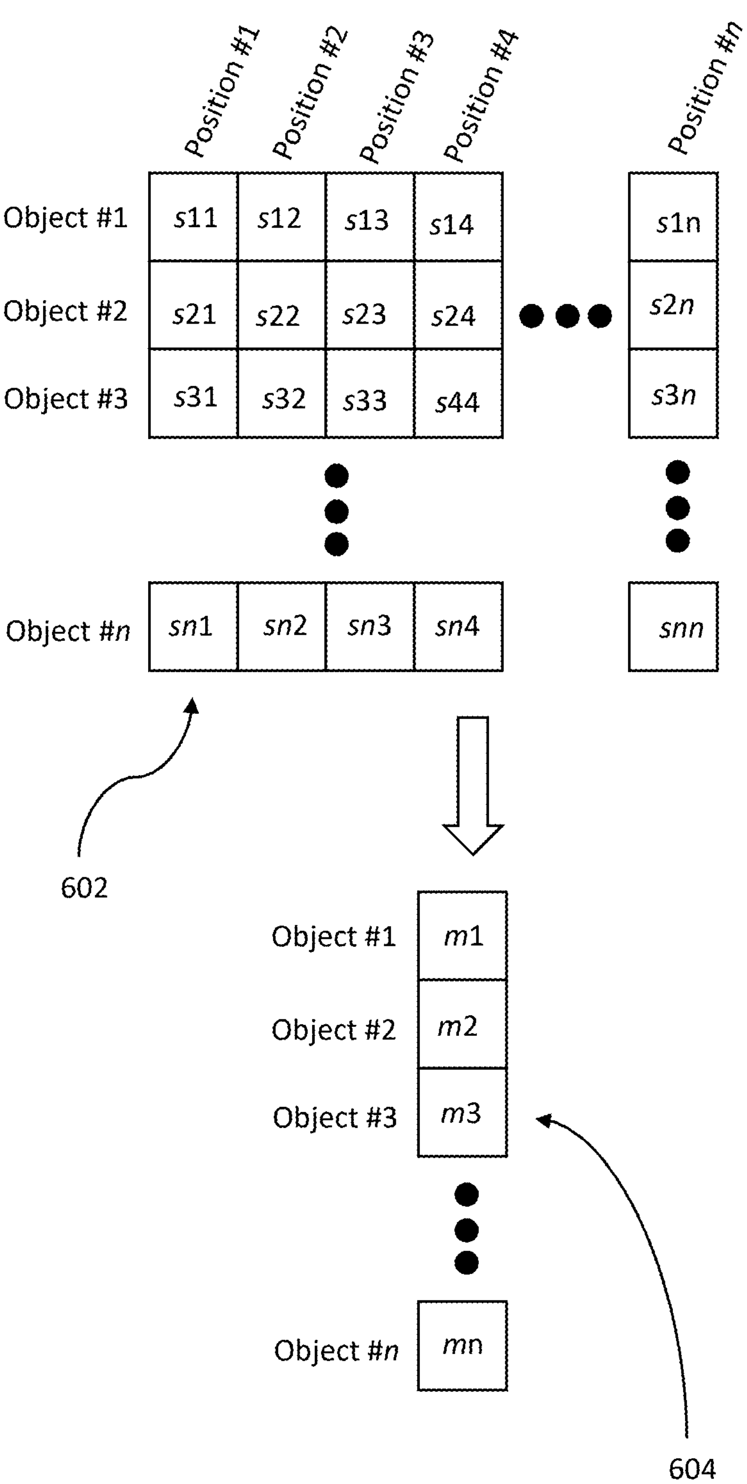
FIG. 6 illustrates an example 2D array for processing scores.

FIG. 6 illustrates an example of how scores for multiple reachable positions and multiple objects may be efficiently processed by the vehicle system 110 to determine respective metrics, m, for multiple objects. As illustrated in FIG. 6, the scores s for multiple positions and multiple objects may be stored in a 2D array 602. The 2D array 602 may be of size [number of objects]×[number of positions/polygons in the occupancy grid representing environment 100]. In other words, the 2D array 602 may contain an element for each combination of object and position in the occupancy grid. For example, the score $s_{12}$ may represent the score for the first object 104 at indexed position #2 of the occupancy grid. Although discussed here in terms of the occupancy grid, other examples may generate similar 2D arrays representing any for of indexed, discretized positions.

In the illustrated example, each row of the 2D array 602 represents a particular object, such as the first object 104. Examples may comprise reducing each row of scores s to a single value, which may be, or may be used to determine, the metric m for the object of that row. FIG. 6 illustrates this reduction, forming a 1D array 604 providing respective metrics m for each object in the environment 100. Such a reduction may comprise selecting a single value from the scores s for a given object, such as a maximum or minimum score. Alternatively the reduction may comprise combining scores s for a given object, for example combining all or a subset of scores as a mean or weighted sum. In particular examples, the reduction may be performed based at least in part a parallel reduction algorithm. A parallel reduction algorithm may efficiently perform the calculation of metrics for large numbers of objects in parallel, any may be performed for example by a GPU associated with vehicle system 110. Such techniques may provide computationally efficient methods for determining metrics associated with large numbers of vehicles, minimizing the latency involved in performing process 200.

Returning to FIG. 2, process 200 may further comprise operation 212. Operation 212 may comprise determining to include the first object 104 in a set of objects based at least in part on the score associated with the first position. For example, it may be determined to include the first object 104 in the set of objects based at least in part on the metric m for that object, which itself may be determined based at least in part on the score for the first position. As discussed further below, the set of objects may be the set provided for full prediction processing, for example by a GNN-based prediction technique.

In some examples, determining to include the first object 104 in the set of objects may comprise comparing the metric $m_1$ associated with the first object 104 to a threshold. In case where a larger metric represents a more important object (e.g., greater likelihood of interaction with vehicle 102), the first object 104 may be included if its associated metric $m_1$ is greater than the threshold value.

Alternatively or additionally, some examples may compare the metrics m for multiple objects to each other to determine which objects to include in the set of objects for full prediction processing. For example, objects may be ranked according to their respective metric m. A predetermined number of objects may be included in the set of objects based at least in part on their rank. For example, the top k objects in the rank of objects may be included in the set of objects. In some examples, such a ranking approach may be combined with a threshold as discussed above. For example, a threshold may be used as an initial filter, removing from consideration any objects that do not satisfy the threshold condition. If the number of remaining objects is more than the predetermined number k of desired objects, the remining objects may be ranked to select the top k to include the set of objects for full prediction processing. Such techniques may therefore filter the objects in the environment such that only the most relevant k are provided for computationally intensive prediction processing, which may reduce the overall latency of the prediction and planning processes of vehicle 102 while still maintaining the benefit of advance prediction calculations provided by the prediction component 120.

Returning to FIG. 2, process 200 may further comprise operation 214. Operation 214 may comprise determining, based at least in part a first prediction method, predicted future positions of objects in the set of objects. The first prediction method may in some examples comprise processing objects by one or more machine learned models, such as a GNN. The first prediction method may comprise the techniques discussed above in relation to the prediction component 120. The first prediction method may comprise any of the prediction techniques discussed in US2023159059A1, which is incorporated herein by reference in its entirety for all purposes.

In some examples, if it is determined to not include an object in the set of objects, or determined to not determine predicted positions for an object based at least in part on the first prediction method, said object may instead be processed according to a second prediction method to estimate a future position of the object. The second prediction method may generally be a computationally more efficient process than the first prediction method. The second prediction method may comprise conventional (i.e., non-machine learned) algorithms. The second prediction method may comprise a heuristic algorithm. The second prediction method may comprise estimating a future position of the object based at least in part on assuming a constant speed, acceleration, and/or direction. For example, the second prediction method may assume that the object will continue to travel with its current speed, acceleration, and/or direction (as determined from the sensor data). In some examples, where the object is an on-road object, the second prediction method may determine a future position assuming that the object will continue in the same lane, for example following the center of its current lane. Where the object is an off-road object, the second prediction method may determine a future position assuming that the object will continue in a straight line. The second prediction method may thus represent a simple estimate of where an object may be at the end of a prediction time window, which may require much fewer computational resources to calculate than a GNN-based prediction technique.

Returning to FIG. 2, process 200 may comprise operation 216. Operation 216 may comprise controlling the vehicle 102 to traverse the environment 100 based at least in part on the predicted future positions. For example, operation 216 may comprise determining one or more trajectories, for example by the planning component 118. The vehicle 102 may then be controlled according to such trajectories. These trajectories may be determined, for example by the planning component 118, based at least in part on predicted positions of objects around the vehicle 102 as determined/estimated by the first and/or second prediction methods discussed above.

Figure 7:
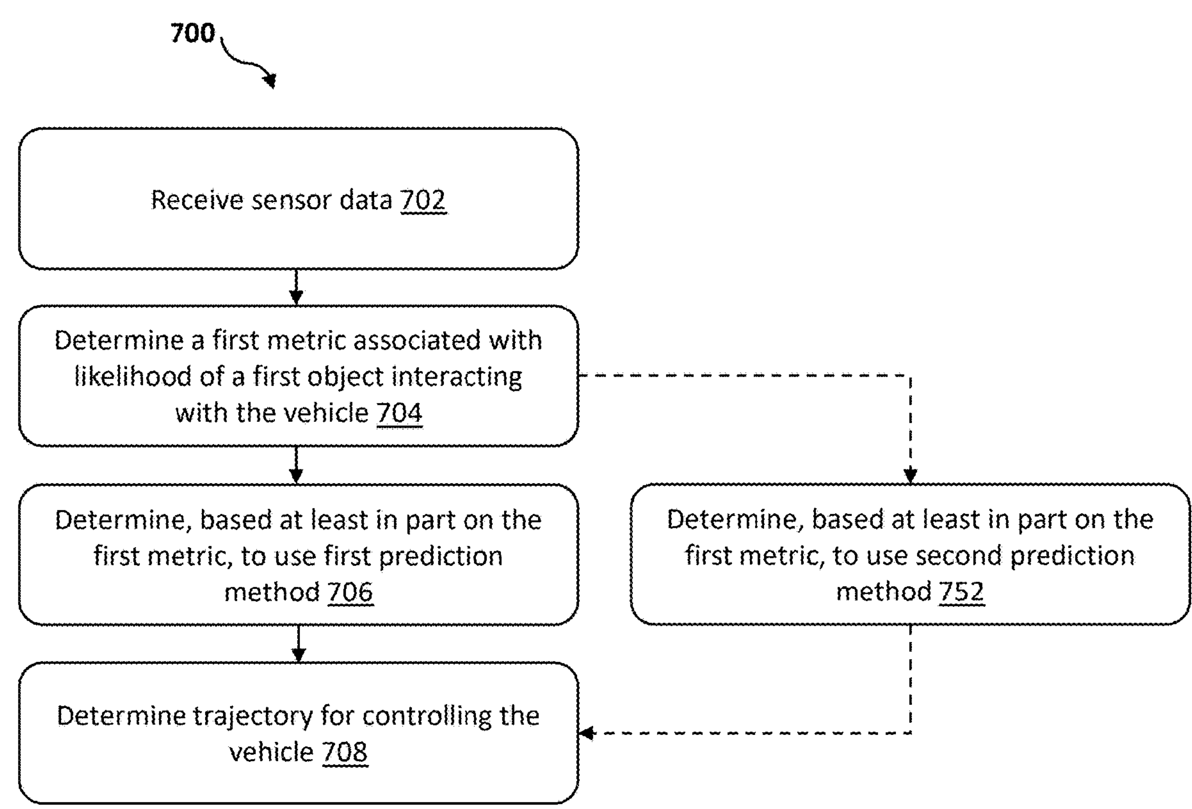
FIG. 7 depicts a flow chart of a further process according to the present disclosure.

FIG. 7 illustrates a process 700 which may be used to determine whether to process an object according to a more computationally intensive prediction technique. Process 700 may be implemented on a system comprising one or more processors and one or more non-transitory computer-readable media storing instructions that, when executed, perform the operations of process 700. Process 700 may be implemented as one or more transitory or non-transitory computer-readable media storing instructions executable by one or more processors, wherein the instructions, when executed, cause the one or more processors to perform the operations of process 700. Process 700 may be implemented as a computer program comprising instructions which, when executed by a computer device, cause the computer device to perform the operations of process 700. Process 700 may be implemented on vehicle computing device 804 described below in relation to FIG. 8. Process 700 may be implemented at least in part by prediction component 120. Although primarily described herein as being performed onboard a vehicle, in some examples process 700 may be performed by a remote computer system, such as the computer device(s) 832 discussed in relation to FIG. 8.

Process 700 may comprise operation 702, which may comprise receiving sensor data from a sensor associated with a vehicle in an environment, the environment including a first object. Process 702 may be similar to process 202 discussed above.

Process 700 may comprise operation 704, which may comprise determining, based at least in part on the sensor data, a first metric associated with likelihood of the first object interacting with the vehicle in a future time window. In some examples, operation 704 may comprise determining, based at least in part on the sensor data, a set of reachable positions of the first object in a future time window, and determining the first metric based at least in part on the set of reachable positions. An object may be considered to interact with the vehicle if the object and vehicle occupy the same position (e.g., the same polygon of an occupancy/discretized grid), or same approximate position (e.g., within a buffer area of a given position). An object may be considered to interact with the vehicle if a minimum arrival time of the object at the position is less than a maximum arrival time of the vehicle at (or approximately at) that position. A metric may be determined similarly to the metric m discussed above in relation to one or more of operations 206, 208, and/or 210.

Process 700 may comprise operation 706, which may comprise determining, based at least in part on the first metric, to predict a future position of the first object based at least in part on a first prediction method. The first prediction method may comprise a machine learned model, for example a GNN, as discussed above in relation to operation 212. Determining whether to predict the future position may comprise the considerations discussed above in relation to operation 212 for determining whether to include an object in the set of objects.

Process 700 may comprise operation 708, comprising determining a trajectory for controlling the vehicle based at least in part on the future position of the first object. Operation 708 may be similar to operation 216 described above. In particular, operation 708 may comprise determining a trajectory by a planning component 118.

In the illustrated example, process 700 may further comprise operation 752. Operation 752 may comprise determining, based at least in part on the first metric, to estimate a future position of the first object based at least in part on a second prediction method. The second prediction method may comprise a heuristic algorithm, as discussed above. As in the illustrated example, the trajectory determined in operation 708 may be based in part on estimated positions determined according to operation 752. For example, the planning component 118 may be provided with predicted positions of some objects determined by the first prediction method, and estimated positions of other objects determined by the second prediction method. Such an approach may provide the planning component 118 with information about all objects in the environment 100, while still providing the increased computational efficiency discussed above. In some examples, the predicted/estimated positions of objects (e.g., from either prediction method) may be further filtered before being provided to the planning component 118, for example according to one or more relevancy filters. In some examples, operation 752 may be omitted. That is, if it is determined to not use the first prediction method for an object, no further processing of that object may occur.

In some examples, operation 704 and/or 706 may be performed by prediction component 120. In other examples, operation 704 and/or 706 may be performed by another computational component of vehicle system 110.

Figure 8:
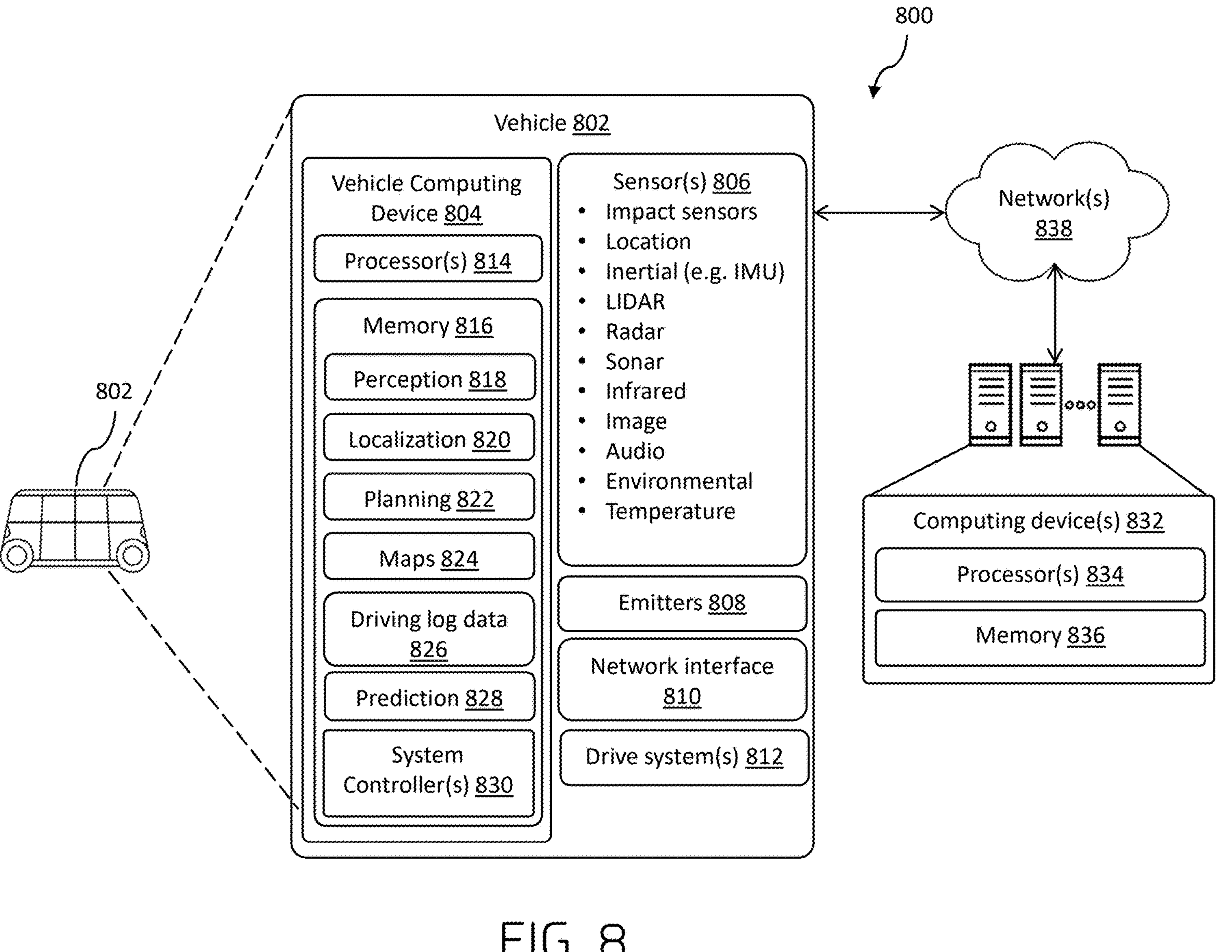
FIG. 8 is a block diagram illustrating an example vehicle system according to the present invention.

FIG. 8 illustrates a block diagram of an example system 800 that implements the techniques discussed herein. FIG. 8 may represent vehicle 102 of FIG. 1. In some instances, the example system 800 may include a vehicle 802, which may represent the vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device(s) 804, sensor(s) 806, emitter(s) 808, network interface(s) 810, and/or drive system(s) 812. Sensor(s) 806 may represent sensor(s) 108. The system 800 may additionally or alternatively comprise computing device(s) 832.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 832.

The vehicle 802 may also include emitter(s) 808 for emitting light and/or sound, as described above. The emitter(s) 808 may include interior audio and visual emitter(s) to communicate with passengers of the vehicle 802. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). The network interface(s) 810 may facilitate communication with other local computing device(s) on the vehicle 802 and/or the drive component(s) 812. The network interface(s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with computing device(s) 832 over a network 838. In some examples, computing device(s) 832 may comprise one or more nodes of a distributed computing system (e.g., a cloud computing architecture).

The vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 814 and memory 816 communicatively coupled with the one or more processors 814. Computing device(s) 832 may also include processor(s) 834, and/or memory 836. The processor(s) 814 and/or 834 may be any suitable processor capable of executing instructions to process data and perform operations as described herein. By way of example and not limitation, the processor(s) 814 and/or 834 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 816 and/or 836 may be examples of non-transitory computer-readable media. The memory 816 and/or 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 816 and/or memory 836 may store a perception component 818, localization component 820, planning component 822, map(s) 824, driving log data 826, prediction component 828, and/or system controller(s) 830—zero or more portions of any of which may be hardware, such as GPU(s), CPU(s), and/or other processing units.

The perception component 818 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 818 is referred to as perception data. The perception component 818 may be configured to associate a bounding region (or other indication) with an identified object. The perception component 818 may be configured to associate a confidence score associated with a classification of the identified object with an identified object. In some examples, objects, when rendered via a display, can be colored based on their perceived class. The object classifications determined by the perception component 818 may distinguish between different object types such as, for example, a passenger vehicle, a pedestrian, a bicyclist, motorist, a delivery truck, a semi-truck, traffic signage, and/or the like.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include and/or request/receive map(s) 824 of an environment and can continuously determine a location, velocity, and/or orientation of the autonomous vehicle 802 within the map(s) 824. In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the perception component 818, a location and/or orientation of the vehicle 802 relative to the environment and/or sensor data associated therewith.

The planning component 822 may receive a location and/or orientation of the vehicle 802 from the localization component 820 and/or perception data from the perception component 818 and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 830 and/or drive component(s) 812 may parse/cause to be carried out, second instructions for the emitter(s) 808 may be formatted according to a second format associated therewith).

The driving log data 826 may comprise sensor data, perception data, and/or scenario labels collected/determined by the vehicle 802 (e.g., by the perception component 818), as well as any other message generated and or sent by the vehicle 802 during operation including, but not limited to, control messages, error messages, etc. In some examples, the vehicle 802 may transmit the driving log data 826 to the computing device(s) 832. The computing device(s) 832 may identify one or more scenarios based at least in part on the log data, which may also comprise defining a scenario, wherein the scenarios are used to generate a playback simulation. For example, the computing device(s) 832 may determine an environmental layout, a number, type, and a configuration of object(s) in the environment and/or associate this definition with one or more portions of log data associated with that scenario. In some examples, the driving log data 826 may comprise (historical) perception data that was generated on the vehicle 802 during operation of the vehicle.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some examples, the prediction component 828 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 822 may be communicatively coupled to the prediction component 828 to generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior. Although prediction component 828 is shown on a vehicle 802 in this example, the prediction component 828 may also be provided elsewhere, such as in a remote computing device. In some examples, a prediction component may be provided at both a vehicle and a remote computing device. These components may be configured to operate according to the same or a similar algorithm.

The memory 816 and/or 836 may additionally or alternatively store a mapping system, a planning system, a ride management system, etc. Although perception component 818 and/or planning component 822 are illustrated as being stored in memory 816, perception component 818 and/or planning component 822 may include processor-executable instructions, machine-learned model(s) (e.g., a neural network), and/or hardware.

As described herein, the localization component 820, the perception component 818, the planning component 822, the simulation system 838, and/or other components of the system 800 may comprise one or more ML models. For example, the localization component 820, the perception component 818, the planning component 822, and/or the simulation system 838 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 820 may additionally or alternatively store one or more system controller(s) 830, which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802.

It should be noted that while FIG. 8 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

EXAMPLE CLAUSES

A: A system comprising one or more processors; and one or more non-transitory computer-readable media storing instructions that, when executed, cause the system to perform operations comprising: receiving sensor data from a sensor associated with a vehicle in an environment, the environment including a first object; determining, based at least in part on the senor data, a first set of positions reachable by the first object in a future time window; determining, for a first position of the first set of positions, a time associated with arrival of the first object at the first position and a weight associated the first position, the first position associated with a planned trajectory of the vehicle; determining a time associated with arrival of the vehicle at the first position; determining, based at least in part on the weight for the first vehicle and the times associated with arrival of the first object and the vehicle at the first position, a score associated with the first position; determining to include the first object in a set of objects based at least in part on the score associated with the first position; determining, based at least in part on a first prediction method, predicted future positions of objects in the set of objects, the first prediction method comprising one or more machine learned models; and controlling the vehicle to traverse the environment based at least in part on the predicted future positions.

B: The system of clause A, wherein the environment includes a second object, the operations comprising: determining, based at least in part on the sensor data, a second set of positions reachable by the second object in the future time window; determining a score associated with a second position of the second set of positions; excluding the second object from the set of objects based at least in part on the score associated with the second position; determining an estimated future position of the second object based at least in part on a second prediction method, the second prediction method associated with use of fewer computational resources that the first prediction method; and controlling the vehicle based at least in on the estimated future position of the second object.

C: The system of clause A or clause B, the operations comprising: determining respective scores for a plurality of positions of the first set of positions; determining, based at least in part on the respective scores of the plurality of positions of the first set of positions, a metric associated with the first object; and determining to include the first object in the set of objects based at least in part on the metric associated with the first object.

D: The system of clause C, comprising determining at least one of: the first set of positions reachable by the first object, or the weight associated with the first position based at least in part on identifying the object as an on-road object or an off-road object.

E: A method comprising, receiving sensor data from a sensor associated with a vehicle in an environment, the environment including a first object; determining, based at least in part on the sensor data, a set of reachable positions of the first object in a future time window; determining, based at least in part on the set of reachable positions, a first metric associated with likelihood of the first object interacting with the vehicle in the future time window; determining, based at least in part on the first metric, to predict a future position of the first object based at least in part on a first prediction method; and determining a trajectory for controlling the vehicle based at least in part on the future position of the first object.

F: The method of clause E, comprising: determining, based at least in part on the sensor data, a second metric associated with likelihood of a second object in the environment interacting with the vehicle in the future time window; and determining, based at least in part on the second metric, to omit predicting a future position of the second object based at least in part on the first prediction method.

G: The method of clause F, comprising: determining, based at least in part on the second metric, an estimated future position of the second object based at least in part on a second prediction method.

H: The method of any of clauses E to G, comprising determining the first metric based at least in part on a classification associated with the first object.

I: The method of any of clauses E to H, wherein the set of reachable positions are associated with a discretized array of positions associated with the environment.

J: The method of any of clauses E to I, wherein determining the set of reachable positions comprises: determining a first subset of positions associated with a possible path of the first object; and determining a second subset of positions comprising positions within a predetermined distance of the possible path of the first object.

K: The method of any of clauses E to J comprising: determining respective scores for plural positions of the set of reachable positions, a respective score associated with a likelihood of the vehicle interacting with the first object at the respective position; wherein the first metric is determined based at least in part on the respective scores for the plural positions.

L: The method of clause K, comprising determining the reachable set of positions of the first object based at least in part on a predetermined velocity or acceleration associated with one or more of: the first object, an object class associated with the first object, or the environment.

M: The method of clause K or clause L, wherein a first score for a first position of the set of reachable positions is determined based at least in part on a time of arrival of the vehicle at the first position and a time of arrival of the first object at the first position.

N: The method of any of clauses K to M, wherein a second score for a second position of the set of reachable positions is determined based at least in part one or more of: (i) a number of lanes between the second position and a current position of the first object; or (ii) an angle between the second position and a direction of a current velocity of the first object.

O: The method of any of clauses K to N, comprising omitting determining a score for a third position of the set of reachable positions based at least in part on one or more of: (i) the third position not being associated with a planned trajectory of the vehicle; (ii) a maximum arrival time of the vehicle at the third position being earlier than a minimum arrival time of the first object at the third position; or (iii) a maximum arrival time of the first object at the second position being earlier than a minimum time of arrival of the vehicle at the third position.

P: The method of any of clauses E to O, comprising: determining to predict the future position of the first object using the first prediction method based at least in part on the first metric satisfying a threshold criterion; or determining to predict a future position of a third object using a second model based at least in part on a third metric associated with the third object not satisfying a threshold criterion.

Q: The method of any of clauses E to P, comprising: determining respective metrics associated with a plurality of objects in the environment; determining to predict the future position of the first object using the first prediction method based at least in part on comparing the respective metrics of the plurality of objects; and determining to predict the future position of a fourth object of the plurality of objects using a second prediction method based at least in part on comparing the respective metrics of the plurality of objects.

R: One or more non-transitory computer-readable media storing instructions executable by one or more processors, wherein the instructions, when executed, cause the one or more processors to perform operations comprising: receiving sensor data from a sensor associated with a vehicle in an environment, the environment including a first object; determining, based at least in part on the sensor data, a set of reachable positions of the first object in a future time window; determining, based at least in part on the set of reachable positions, a first metric associated with likelihood of the first object interacting with the vehicle in a future time window; determining, based at least in part on the first metric, to predict a future position of the first object based at least in part on a first prediction method; and determining a trajectory for controlling the vehicle based at least in part on the future position of the first object.

S: The one or more non-transitory computer-readable media of clause R, wherein the first object is a vehicle, a pedestrian, a cyclist, or an animal.

T: The one or more non-transitory computer-readable media of clause R or clause S, further comprising controlling the vehicle based at least in part on the trajectory While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing instructions that, when executed, cause the system to perform operations comprising:

receiving sensor data from a sensor associated with a vehicle in an environment, the environment including a first object;

determining, based at least in part on the sensor data, a first set of positions reachable by the first object in a future time window, wherein the first set of positions are associated with a discretized array of positions associated with the environment;

determining, for a first position of the first set of positions, a time associated with arrival of the first object at the first position and a weight associated with the first position, the first position associated with a planned trajectory of the vehicle;

determining a time associated with arrival of the vehicle at the first position;

determining, based at least in part on the weight associated with the first position and the times associated with arrival of the first object and the vehicle at the first position, a score associated with the first position;

determining respective scores for a plurality of positions of the first set of positions;

determining, based at least in part on the respective scores of the plurality of positions of the first set of positions, a metric associated with the first object;

determining to include the first object in a set of objects based at least in part on the metric associated with the first object;

determining, based at least in part on a first prediction method, predicted future positions of objects in the set of objects, the first prediction method comprising one or more machine learned models; and controlling the vehicle to traverse the environment based at least in part on the predicted future positions.

2. The system of claim 1, wherein the environment includes a second object, the operations comprising:

determining, based at least in part on the sensor data, a second set of positions reachable by the second object in the future time window;

determining a score associated with a second position of the second set of positions;

excluding the second object from the set of objects based at least in part on the score associated with the second position;

determining an estimated future position of the second object based at least in part on a second prediction method, the second prediction method associated with use of fewer computational resources than the first prediction method; and controlling the vehicle based at least in on the estimated future position of the second object.

3. The system of claim 1, comprising determining at least one of: the first set of positions reachable by the first object, or the weight associated with the first position based at least in part on identifying the object as an on-road object or an off-road object.

4. A method comprising:

receiving sensor data from a sensor associated with a vehicle in an environment, the environment including a first object;

determining, based at least in part on the sensor data, a set of reachable positions of the first object in a future time window;

determining, based at least in part on the set of reachable positions, a first metric associated with likelihood of the first object interacting with the vehicle in the future time window, wherein the set of reachable positions are associated with a discretized array of positions associated with the environment;

determining, based at least in part on the first metric, to predict a future position of the first object based at least in part on a first prediction method;

determining a trajectory for controlling the vehicle based at least in part on the future position of the first object; and controlling the vehicle based at least in part on the trajectory.

5. The method of claim 4, comprising:

determining, based at least in part on the sensor data, a second metric associated with likelihood of a second object in the environment interacting with the vehicle in the future time window; and determining, based at least in part on the second metric, to omit predicting a future position of the second object based at least in part on the first prediction method.

6. The method of claim 5, comprising:

determining, based at least in part on the second metric, an estimated future position of the second object based at least in part on a second prediction method.

7. The method of claim 4, comprising determining the first metric based at least in part on a classification associated with the first object.

8. The method of claim 4, wherein determining the set of reachable positions comprises:

determining a first subset of positions associated with a possible path of the first object; and determining a second subset of positions comprising positions within a predetermined distance of the possible path of the first object.

9. The method of claim 4, comprising:

determining respective scores for plural positions of the set of reachable positions, a respective score associated with a likelihood of the vehicle interacting with the first object at the respective position;

wherein the first metric is determined based at least in part on the respective scores for the plural positions.

10. The method of claim 9, comprising determining the reachable set of positions of the first object based at least in part on a predetermined velocity or acceleration associated with one or more of: the first object, an object class associated with the first object, or the environment.

11. The method of claim 9, wherein a first score for a first position of the set of reachable positions is determined based at least in part on a time of arrival of the vehicle at the first position and a time of arrival of the first object at the first position.

12. The method of claim 9, wherein a second score for a second position of the set of reachable positions is determined based at least in part on one or more of:

(i) a number of lanes between the second position and a current position of the first object; or (ii) an angle between the second position and a direction of a current velocity of the first object.

13. The method of claim 9, comprising omitting determining a score for a third position of the set of reachable positions based at least in part on one or more of:

(i) the third position not being associated with a planned trajectory of the vehicle;

(ii) a maximum arrival time of the vehicle at the third position being earlier than a minimum arrival time of the first object at the third position; or (iii) a maximum arrival time of the first object at the second position being earlier than a minimum time of arrival of the vehicle at the third position.

14. The method of claim 4, comprising:

determining to predict the future position of the first object using the first prediction method based at least in part on the first metric satisfying a threshold criterion; or determining to predict a future position of a third object using a second model based at least in part on a third metric associated with the third object not satisfying a threshold criterion.

15. The method of claim 4, comprising:

determining respective metrics associated with a plurality of objects in the environment;

determining to predict the future position of the first object using the first prediction method based at least in part on comparing the respective metrics of the plurality of objects; and determining to predict the future position of a fourth object of the plurality of objects using a second prediction method based at least in part on comparing the respective metrics of the plurality of objects.

16. One or more non-transitory computer-readable media storing instructions executable by one or more processors, wherein the instructions, when executed, cause the one or more processors to perform operations comprising:

receiving sensor data from a sensor associated with a vehicle in an environment, the environment including a first object;

determining, based at least in part on the sensor data, a set of reachable positions of the first object in a future time window;

determining, based at least in part on the set of reachable positions, a first metric associated with likelihood of the first object interacting with the vehicle in a future time window, wherein the set of reachable positions are associated with a discretized array of positions associated with the environment;

determining, based at least in part on the first metric, to predict a future position of the first object based at least in part on a first prediction method;

determining a trajectory for controlling the vehicle based at least in part on the future position of the first object; and controlling the vehicle based at least in part on the trajectory.

17. The one or more non-transitory computer-readable media of claim 16, wherein the first object is a vehicle, a pedestrian, a cyclist, or an animal.

* * * * *